United States Patent
Falcetta et al.

[11] Patent Number: 5,133,745
[45] Date of Patent: Jul. 28, 1992

[54] ULTRAVIOLET ABSORBING HYDROGELS

[75] Inventors: Joseph J. Falcetta; Joonsup Park, both of Arlington; Christina G. Smith, Haltom City, all of Tex.

[73] Assignee: Alcon Laboratories, Inc., Fort Worth, Tex.

[21] Appl. No.: 691,160

[22] Filed: Apr. 24, 1991

Related U.S. Application Data

[63] Continuation of Ser. No. 570,486, Aug. 21, 1990, abandoned, which is a continuation of Ser. No. 198,904, May 26, 1988, abandoned.

[51] Int. Cl.$^5$ .................................................. A61F 2/16
[52] U.S. Cl. ........................................ 623/6; 351/160 H; 351/163; 523/108; 524/91
[58] Field of Search .............. 623/6; 351/160 H, 163; 524/91; 523/106, 108; 548/259; 526/259

[56] References Cited

U.S. PATENT DOCUMENTS

| | | | |
|---|---|---|---|
| 3,220,960 | 11/1965 | Wichterle | 260/2.5 |
| 4,304,895 | 12/1981 | Loshaek | 526/313 |
| 4,390,676 | 6/1983 | Loshaek | 526/313 |
| 4,493,539 | 2/1970 | Skoultchi et al. | 260/47 |
| 4,528,311 | 7/1985 | Beard | 524/91 |

OTHER PUBLICATIONS

Sustic et al., *New 2(2-Hydroxyphenyl2H-Benzotriazole Based Polymer-Bound Ultraviolet Stabilizers*, Polymer Preprints, 28(2), pp. 226–227 (1987).

Pitts et al., *Protection Against UVR Using the Vistakon UV-Bloc Soft Contact Lens*, International Contact Lens Clinic, vol. 14, No. 1, pp. 22–29 (1987).

Kraff et al., *Effect of an Ultraviolet-Filtering Intraocular Lens on Cystoid Macular Edema*, Ophthalmology, vol. 92, pp. 366–369 (1985).

Dickstein et al. *Functional Polymer, XXVI Co-and Terpolymers Involving Methacrylates, N-Vinylpyrollidone, and Polymerizable Ultraviolet Stabilizers and Antioxidants*, J. Macromol. Sci-Chem., A22(4), pp. 387–402 (1985).

*Primary Examiner*—Randall L. Green
*Assistant Examiner*—Paul Prebilic
*Attorney, Agent, or Firm*—James Arno; Sally Yeager

[57] ABSTRACT

Two compounds, which are derivatives of 2(2-hydroxyphenyl) 2H-benzotriazole, are copolymerized with hydrogel forming monomers to form ultraviolet absorbing hydrogels. These hydrogels have many potential applications. For instance, they can be used to make contact lenses and intraocular lenses which are particularly useful for aphakics.

15 Claims, 1 Drawing Sheet

ULTRAVIOLET ABSORBING HYDROGELS

This application is a continuation of application Ser. No. 07/570,486 filed Aug. 21, 1990 now abandoned which is a continuation of application Ser. No. 198,904 filed May 26, 1988 now abandoned.

FIELD OF THE INVENTION

The present invention relates to ultraviolet absorbing hydrogels and to the use of these hydrogels in lenses, such as contact lenses and intraocular lenses.

BACKGROUND OF THE INVENTION

Various parts of the eye absorb portions of the incident light which strikes the eyes so that only the unabsorbed or transmitted portions reach the retina. The cornea preferentially absorbs wave lengths up to about 340 nanometers (nm). The natural crystalline lens absorbs most of the ultraviolet wave lengths between 300 and 400 nm. Other parts of the eye absorb portions of the visible spectrum.

For those persons who have had one or both of their natural lenses removed, for example as a result of injury or disease, a condition known as aphakia, UV light is no longer absorbed but is instead transmitted to the retina. Lenses used to replace the natural lens such as IOLs made of polymethyl methacrylate (PMMA) usually contain compounds that function as UV absorbers, preventing transmittance of wave lengths of between about 300–400 nm to the retina.

It has long been recognized that UV absorbers are necessary to prevent degradation in polymers exposed to UV radiation from sunlight or indoor exposure to fluorescent light. U.S. Pat. No. 3,433,539 issued to Skoultchi et al, Feb. 3, 1970, discloses derivatives of 2-(2-hydroxyphenyl) benzotriazoles and their copolymerization with known vinyl monomers for preventing UV degradation.

The value of including UV absorbing compounds in contact lenses and intraocular lenses (IOLs) has also been recognized. In a study done with pigmented rabbits by D. Pitts and M. Lattornal reported in Protection Against UVR Using the Vistacon UV/Bloc Soft Contact Lenses, International Contact Lens Clinic, Vol. 14, No. 1 pp. 22–29 (January 1987) results indicated that UV/Bloc lenses provided protection against ultraviolet radiation damage to the eye, whereas contact lenses without a UV absorber provided essentially no protection against UV damage. Furthermore, studies have shown that use of UV filtering IOLs versus use of IOLs without UV absorbers resulted in a decrease in the incidence of cystoid macular edema, see C. Kraff et al Effect of an Ultraviolet Filtering Intraocular Lens in Cystoid Macular Edema, Ophthalmology, Vol. 92, pp. 366–369. Unlike addition of UV absorbers in polymers in, for example, protective coatings to prevent polymer degradation, UV absorbers in contact lenses and IOLs are desired for protection of the eye rather than protection of the material forming the lens. However, the UV absorbers in the lenses will also help prevent degradation of the lenses.

U.S. Pat. Nos. 4,304,895 and 4,390,676 issued to Loshaek, Dec. 8, 1981 and Dec. 28, 1983 respectively, disclose use of UV absorbers in lenses. In particular UV absorbing compounds which can be polymerized with the monomeric material used to form the lenses are disclosed. Specific UV absorbing compounds disclosed include 2-hydroxy-4-methacryloxy benzophenones and mixtures thereof.

U.S. Pat. No. 4,528,311 issued Jul. 9, 1985 to Beard et al discloses UV light absorbing polymer compositions of 2-hydroxy-5-acryloxy phenyl-2-H-benzotriazoles useful in a variety of organic polymers to provide UV absorption properties. The patent in particular discloses use of the compositions in IOLs and contact lenses.

Hydrogels based on vinyl pyrrolidone containing UV absorbing comonomers are described in Dickstein and Vogl, Functional Polymers XXVI, Co and Terpolymers, Involving Methacrylates, N-Vinyl Pyrrolidone and Polymerizable Ultraviolet Stabilizers and Antioxidants, J. Macromol. Sci-Chem., A 22(4) pp. 387–402 (1985). However, those hydrogels are not suitable for use in IOLs.

Although IOLs made of, for example, PMMA are extensively used, hydrogel IOLs are preferred. They are preferred for several reasons. First, hydrogels are flexible and can be folded and inserted through a smaller incision in the eye during surgery resulting in less trauma to the surgical site. Insertion of PMMA IOLs generally requires an incision in the eye of about 6.5–8 mm, whereas a hydrogel lens requires only about a 3.5–4 mm incision.

Second, hydrogels are considered more biocompatible than conventional IOLs. In this respect if a hydrogel contacts any surface within the eye, for example during implantation, it is less likely to damage that surface, it being hydrophilic like the tissues of the eye. Furthermore, hydrogels are termed YAG laser compatible. This means that when laser procedures for correcting opacification are done, the laser radiation, when it inadvertently strikes the implanted IOL, does less damage to a hydrogel than to a PMMA lens.

Third, hydrogels can be steam sterilized rather than chemically sterilized as is the case with, for example, PMMA lenses. Steam sterilization is desired because it is more effective and eliminates the need for removal of chemicals which can irritate ophthalmic tissue after the lens is implanted.

Hydrogels are desirable for use in lenses, particularly IOLs. However, because of their hydrophilic nature and expanded structure, it has been difficult to incorporate UV absorbing compounds ("UV absorbers") into hydrogels. Prior art UV absorbers are generally hydrophobic and have limited solubility in hydrogels. Due in part to this limited solubility, it has been difficult to copolymerize UV absorbers with hydrogel forming monomers. UV absorbers are preferably copolymerized, rather than physically entrapping the absorber within the hydrogel, to prevent the absorber from being leached out of the UV absorbing hydrogel when the hydrogel is in the aqueous environment of the eye or stored in solution.

In addition to problems of incorporation of UV absorbers into hydrogels, UV absorbers having the required characteristics such as UV absorption between 300–400 nm and hydrolytic stability have been difficult to synthesize.

SUMMARY OF THE INVENTION

Figure 1:
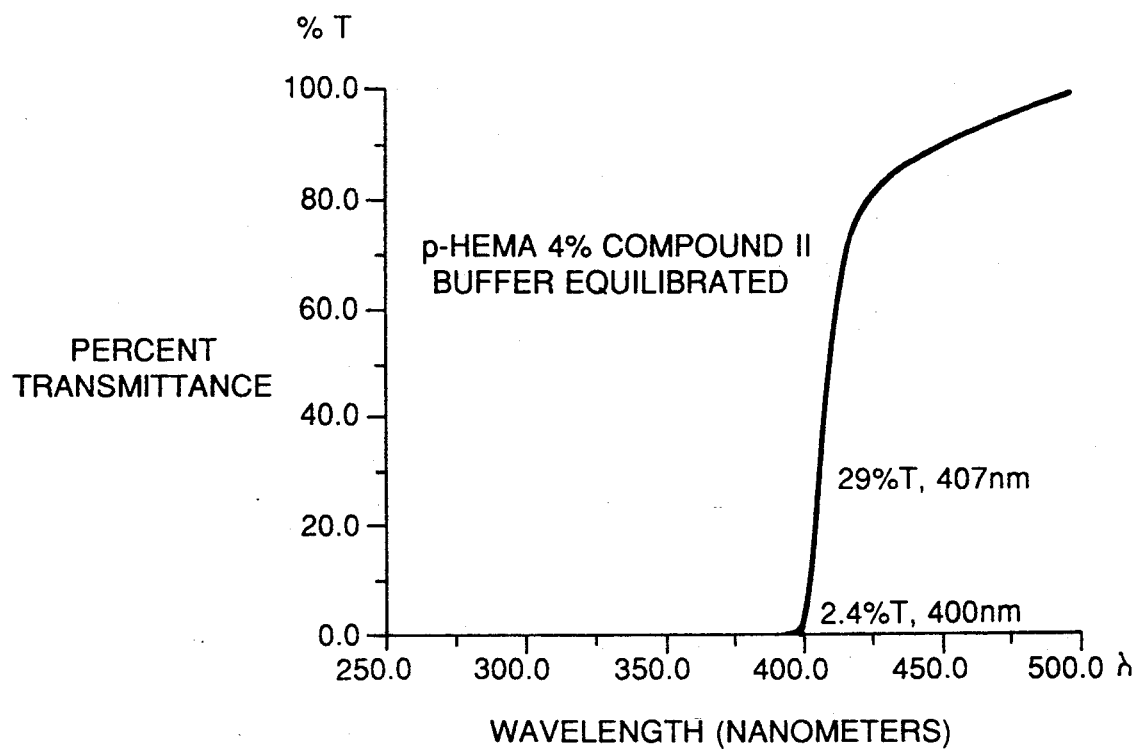
FIG. 1 shows the UV transmittance spectrum of a UV absorbing hydrogel comprising Compound II and hydroxyethylmethacrylate (HEMA).

According to the present invention, problems of incorporation of suitable UV absorbers into hydrogels have been surmounted. The present invention is directed to the copolymerization of certain UV absorbing monomers with hydrogel forming monomers such as hydroxyethylmethacrylate (HEMA) to form UV absorbing hydrogels. One UV absorbing monomer, identified herein as Compound [I] is known, see Sustic, Zhang and Vogl, New 2(2-Hydroxyphenyl)2H-Benzotriazole Based Polymer-Bound Ultraviolet Stabilizers, Polymer Preprints 28(2) pp. 226,7 (1987). The UV absorber identified herein as Compound [II] is a novel derivative of 2(2-hydroxyphenyl)2H-benzotriazole, wherein the methoxy group of Compound [I] is replaced with a halogen, namely chlorine.

The hydrogels of the present invention exhibit long-term hydrolytic stability and the UV absorbing monomers therein have a transmittance of less than about 30% to 400 nm.

The UV absorbing hydrogels of the present invention have potential applications. For example, they can be used to make contact lenses and intraocular lenses. These lenses are of particular use for aphakics who no longer have a natural, crystalline lens to absorb UV radiation from incident light.

DETAILED DESCRIPTION

For purposes of the present specification, the following definitions relating to polymers of the hydrogel type shall apply: "hydrogel" means a crosslinked polymer having an equilibrium content between about 10 and 90 percent water; "hydrogel forming monomer" means any monomer that can be polymerized or copolymerized to form a hydrogel; "UV absorbing monomer" means a monomer capable of absorbing UV radiation; "UV absorbing hydrogel" means a copolymer comprising a hydrogel forming monomer and a UV absorbing monomer. Hydrogels can be made of any monomer which when polymerized or copolymerized with other monomers results in a polymer or copolymer with hydrogel characteristics, for example, those described in U.S. Pat. No. 3,220,960 issued to Wichterle et al, whose disclosure as it relates to hydrogel monomers is incorporated herein by reference. Wichterle's polymers are hydroxy lower alkyl ($C_1$ to $C_8$) methacrylates or acrylates, cross-linked with a small percentage of the corresponding diester of the particular methacrylate or acrylate, for example, ethylene glycol dimethacrylate (EGDMA). Examples of another class of suitable hydrophilic monomers are the N-vinyl heterocyclic monomers, suitable examples of such monomers being N-vinyl-2-pyrrolidone, N-vinyl pyridine and N-vinyl caprolactams. Also another class of hydrophilic monomers are the polymerizable olefinic acids and amides; suitable examples being acrylic acid, methacrylic acid, itaconic acid, fumaric acid, maleic acid, crotonic acid, acrylamide, methacrylamide and N-(1,1,-dimethyl-3-oxobutyl acrylamide). Another suitable group of hydrophilic monomers are the lower alkyl vinyl ethers such as methyl and ethyl vinyl ether.

Hydrogels for use in contact lenses or IOLs ideally must contain a UV absorbing compound. This is particularly the case when the lens is to be used to replace the natural lens of the eye lost to injury or disease. The present invention is directed to UV absorbing hydrogels having the following characteristics.

First, the UV absorbing monomer of the UV absorbing hydrogel should absorb UV radiation between about 300-400 nm because the purpose of incorporating a UV absorber into a hydrogel is to prevent transmittance of UV radiation to the retina. As previously discussed, this function is normally performed by the eye's natural lens. Although the UV absorbing hydrogel should absorb UV radiation between about 300 to 400 nm, it is desirable that absorbance sharply decrease above 400 nm. If absorbance does not sharply decrease above 400 nm the UV absorbing hydrogel will take on a significant yellow tint.

Second, it is desirable to incorporate a UV absorbing monomer into the hydrogel at the lowest concentration possible in order to minimize the impact the compound has on the structure of the hydrogel. Hydrogels are particularly susceptible to being adversely affected by the addition of other compounds due to their expanded structure. Most UV absorbing monomers with good UV absorbing characteristics are more hydrophobic than hydrogel forming monomers. The addition of any significant amount of a UV absorbing monomer to a hydrogel forming monomer decreases the water content of the resulting UV absorbing hydrogel. This can adversely impact the desirable properties of the hydrogel. Therefore, it is desirable to use a UV absorbing monomer which effectively absorbs UV radiation thereby minimizing the concentration of absorber required.

Third, it is important the UV absorbing hydrogel be stable as a copolymer and in particular exhibit long-term hydrolytic stability. This is a particularly important requirement when the hydrogel is to be used as an IOL and surgically implanted within the eye, since IOLs are generally intended to remain in the eye indefinitely.

Fourth, the UV absorbing compound to be incorporated into the hydrogel must be soluble in the hydrogel forming monomer so that it can be copolymerized with the hydrogel forming monomer. It is necessary that the UV absorber be copolymerized with the hydrogel forming monomer due to the expanded nature of hydrogels. Because of this expanded structure it is impractical to rely on imbedding or dispersing UV absorbing compounds within the hydrogel as is done with PMMA type lenses. Moreover, copolymerization prevents the UV absorber from being leached from the hydrogel while in the eye or in a storage solution. Solubility of the UV absorbing monomer in the hydrogel forming monomer is thus quite important. At a minimum, the UV absorbing monomer should be soluble in the hydrogel forming monomer in an amount sufficient to provide the desired degree of UV absorbance in the UV absorbing hydrogel.

Fifth, it is important that the UV absorbing monomer copolymerized wit the hydrogel forming monomer be water soluble. After copolymerization, any unpolymerized UV absorber is extracted from the hydrogel with water. Water is used for extraction because it will not disrupt or contaminate the UV absorbing hydrogel. If the UV absorber is not water soluble, it cannot be easily extracted, remaining in the UV absorbing hydrogel and leaching out over time. Such leaching is undesirable when the hydrogel is used to form contact lenses or IOLs.

Sixth, the UV absorbing hydrogels of the present invention are principally for use in the eye. Therefore, it is necessary that the lenses made from the UV absorbing hydrogels not give rise to any toxic responses or interact with the environment in which they are placed.

The present invention is based on the copolymerization of one or both of two UV absorbing monomers with various hydrogel forming monomers to form hydrogels which have the above discussed characteristics. The UV absorbing monomers are derivatives of 2-(2H-benzotrizole-2-yl) phenol having the following structures:

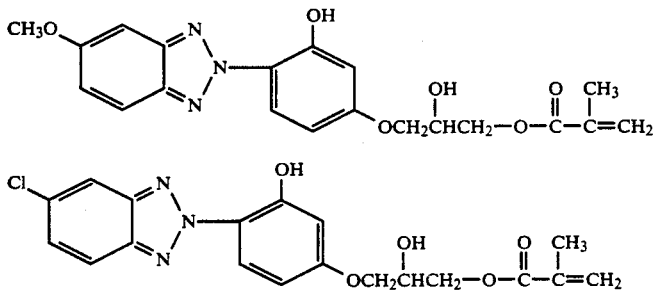

Both Compounds [I] and [II] are phenolic compounds. It is believed that the glycidyl methacrylate portion of the compounds contributes to the improved hydrolytic stability these compounds exhibit in comparison to benzotriazole phenols containing, for example, a methacryloyl group.

Compounds [I] and [II] exhibit the necessary UV absorbing characteristics to effectively prevent transmittance of UV radiation to the retina. Compound [II] exhibits peak absorbance at about 346 nm in chloroform, and when copolymerized with a hydrogel forming monomer such as HEMA at a concentration of about 4 weight percent has a transmittance of 0% at 380 nm and a transmittance of less than 3% at 400 nm. Similarly, Compound [I] exhibits peak absorbance at about 345 nm in chloroform and as a copolymer with HEMA has a transmittance of 0% at 380 nm and a transmittance of 23% at 400 nm.

After copolymerization Compounds [I] and/or [II] can be present in a UV absorbing hydrogel at concentration between about 0.1 to 10.0 wt. %.

Compounds [I] and [II] are soluble in the hydrogel forming monomer, HEMA, up to about 4.0 wt. %. Compound [II] is preferably present at a concentration of about 3.5 wt. %, Compound [I] at about 4.0%.

Compounds [I] and [II] are water soluble and easily extracted from the hydrogel after copolymerization. Thus, lenses made with UV absorbing hydrogels of the present invention will retain their UV absorbing capacity and potentially irritating compounds will not be leached from the lenses into the eye.

Compounds [I] and [II] can be copolymerized with various hydrogel forming monomers to form UV absorbing hydrogels. Hydrogel forming monomers which can be copolymerized with Compounds [I] and [II] include those described in U.S. Pat. No. 3,220,960 issued to Wichterle et al, whose disclosure as it relates to hydrogel monomers is incorporated herein by reference. Wichterle's polymers are hydroxy lower alkyl ($C_1$ to $C_8$) methacrylates or acrylates, cross-linked with a small percentage of the corresponding diester, for example, ethylene glycol dimethacrylate (EGDMA). Another class of suitable hydrophilic monomers are the N-vinyl heterocyclic monomers, such as N-vinyl-2-pyrrolidone, N-vinyl pyridine and N-vinyl caprolactams. Another class of hydrophilic monomers are the polymerizable olefinic acids and amides, such as acrylic acid, methacrylic acid, itaconic acid, furmaric acid, maleic acid, crotonic acid, acrylamide, methacrylamide and N-(1,1-dimethyl-3-oxobutyl acrylamide). Another suitable group of hydrophilic monomers are the lower alkyl vinyl ethers such as methyl and ethyl vinyl ether.

The preferred UV absorbing hydrogels of the present invention comprise Compound [II] copolymerized with HEMA, wherein Compound [II] is present at a concentration of about 0.1 to about 4.0 wt. %, preferably about 3.5 wt. %.

The following examples are by way of illustration and are not intended as limiting.

EXAMPLE 1

Synthesis of 2[2-hydroxy-4-methacryloxy (2'-hydroxy-3'-propoxy)]2H-4-chlorobenzotrizole (Compound [II])

The synthesis of 2[2-hydroxy-4-methacryloxy(2'-hydroxy-3'-propoxy)]2H-4-chlorobenzotriazole was accomplished in two reaction sequences. The first consisted of the synthesis of 2(2,4-dihydroxyphenyl)2H-benzotriazole (A) and the second in the reaction of the 4-hydroxy group of (A) with glycidyl methacrylate to give the monomer Compound [II] according to the scheme set forth below:

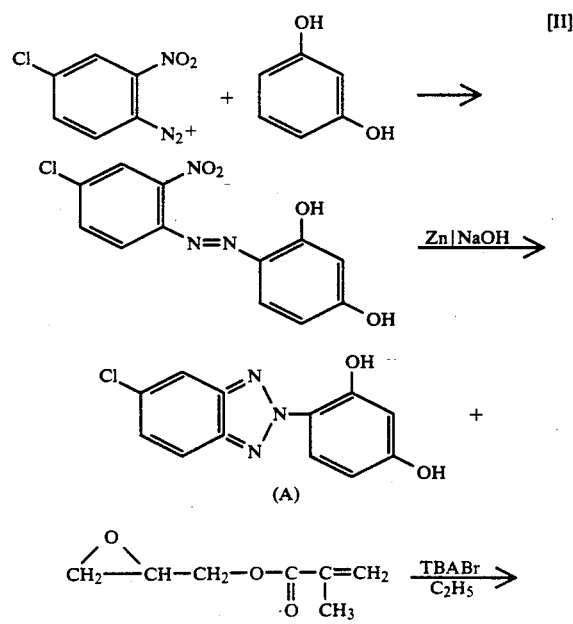

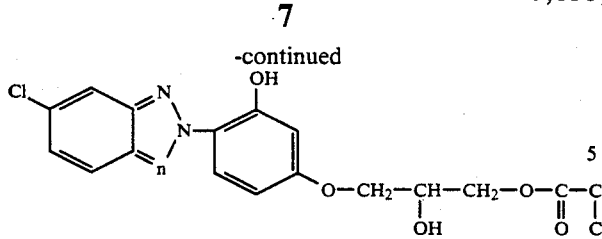
-continued

1. Synthesis of (A)

The synthesis of (A) was accomplished as follows:

4-Chloro-2-nitroaniline (17.3 g, 0.1 moles) was diazotized with sodium nitrite (6.9 g, 0.1 mole) in concentrated hydrochloric acid/water (40 ml/150 ml) at a temperature of −5° C. After about two hours, the mixture was filtered and the clear orange solution of the diazonium salt was added dropwise to a mechanically stirred solution of resorcinol (16.5 g, 0.15 moles) in conc. hydrochloric acid/water (40 ml/150 ml) which was kept at room temperature. Soon after the addition had started a bloodred azo-compound precipitated out of solution while the addition of the diazonium solution continued. Stirring was continued for 2.5 hours, the sludge was filtered and the red filter cake was washed 4-5 times with distilled water.

The wet filter cake (the azo-compound) was dissolved in 500 ml of 1N sodium hydroxide solution in a one liter beaker and zinc powder (33 g, 0.5 moles) was added in portions over a period of half an hour. After the addition of the zinc powder was completed, a 40% sodium hydroxide solution (100 g) was added over a period of one hour and the reaction was continued with stirring at room temperature for a total of 48 hours.

The suspension was filtered through a coarse fritted glass filter and the filter cake (zinc sludge) washed with 100 ml of 5% sodium hydroxide solution. The collected filtrates (dark green in color) were transferred to a two liter beaker kept at a temperature below 10° C. and slowly neutralized with 6N hydrochloric acid. A brown solid was obtained which was collected by filtration; yield 93%. The compound was extracted with benzene (or acetone:benzene=1:3) for 48 hours. A light brown solid was recovered after the evaporation of the solvent (yield 80%). Further purification by recrystallization from ethanol gave an off white solid, m.p.=187°-189° C.

2. Synthesis of Compound [II]

A 100 ml 3-neck round bottom flask was charged with A (5.24 g, 0.02 mole), glycidyl methacrylate (3.0 ml, 0.22 mole), tetra butyl ammonium bromide (TBABr 0.4 g, 1.2 mole) and anhydrous toluene (30 ml), while the entire system was under an atmosphere of dry nitrogen. A trace amount of hydroquinone was also added. The contents of the flask were heated under gentle reflux for 24 hours. After the reaction was complete, the mixture was allowed to cool to room temperature, the solution was filtered, diluted with additional toluene (50 ml), washed 3 times with saturated sodium chloride solution, once with water and dried over anhydrous magnesium sulfate. After filtration, the solvent was evaporated and the crude oily solid, which was obtained in essentially quantitative yield, was dissolved in ethanol, decolorized with charcoal, filtered and the solution concentrated to a volume of 20-25 ml. After storing in the freezer (−20° C.) for one week a yellow solid had deposited which was isolated by filtration (yield 63%) and again recrystallized from ethanol (yield 35%). Polymerization grade Compound II was obtained by column chromatography (silica-gel 60; THF:Hexane=1.3 as the mobile phase).

EXAMPLE 2

Copolymerization of Compound [II] with the Hydrogel Forming Monomer (HEMA)

A film of a copolymer of HEMA and Compound [II] was prepared between (4×4in.) glass plates. The glass plates were pretreated with dimethyldichlorosilane and hydrolyzed to silanize the surface. Masking tape was placed around the edges of a glass plate to control the film thickness (target thickness was usually about 1 mm hydrated). A monomer mix containing 2.01 g HEMA (having an ethylene glycol dimethacrylate content of 0.15%) and 0.0802 g. Compound [II] as prepared in Example 1 was placed on a glass plate, along with 1% of USP 245 as an initiator, the two plates secured together by means of metal clips and the assembly placed in an oven at 60° C. for one and one half hour. At the end of this time the glass plate assembly was heated to 90° C. for an additional 30 minutes. The film was removed from the glass plates and equilibrated in phosphate buffer (0.9% sodium chloride). When equilibrated the film had a hydrated thickness of 0.94 mm.

A disc having a diameter of approximately 15 mm was cut from the film using a cork borer. All spectra were obtained using a Varian DMS 100 double beam UV spectrophotometer. The reference cell contained phosphate buffer. The spectrum obtained is shown in FIG. 1. At 400 nm the transmittance was found to be 2.4%. Of special interest is the sharp rise in transmittance shown above 400 nm. At 410 nm the transmittance is 45.5%. The UV absorbing hydrogel prepared under the above conditions has a very slight yellow tint.

Another film was prepared in a manner similar to the above conditions. The UV spectra of this film was obtained after equilibration and then after 15 hours of water extraction in a Soxhlet apparatus. No significant change was observed between the spectra. This indicates that the UB comonomer is covalently bound and also is hydrolytically stable.

EXAMPLE 3

Copolymerization of Compound [I] with HEMA

Compound [I] was prepared as described in Sustic, Zhang and Vogl, New 2(2-Hydroxyphenyl)2H-Benzotrizole Based Polymer Bound Ultraviolet Stabilizers, Polymer Preprints 28(2) pp. 226, 7 (1987). A film of a copolymer of Compound I (0.163 g) and 3.84 g of HEMA (containing 0.15% EGDMA) was prepared according to the conditions given in Example 2.

Figure 2:
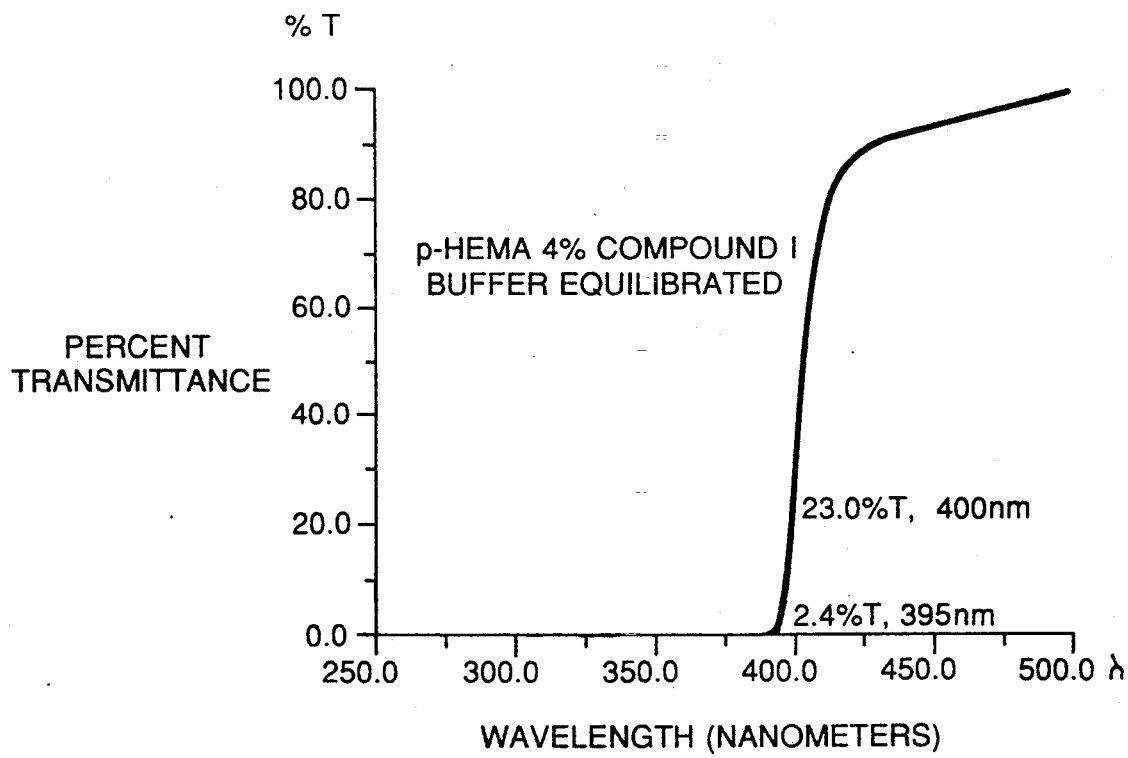
FIG. 2 shows the UV transmittance spectrum of a UV absorbing hydrogel comprising Compound I and HEMA.

The spectrum of the hydrated copolymer thus obtained is shown in FIG. 2. The transmittance at 400 nm is 23.0% for a disc having a thickness 1.1 mm.

EXAMPLE 4

Copolymerization of Compound [II] with HEMA to Form a Rod

Hydroxyethyl methacrylate (having an ethylene glycol dimethacrylate content of 0.25%) 20.0 g was added to a treated clean, dry, 16×25 mm glass, Teflon screw top test tube, along with 0.681 g Compound [II] and 0.108 g USP 245. After degassing with Argon (10 min.) the tube was capped and placed in an oil bath at 55° C.

for 16 hours and then at 80° C. for 24 hours. The rod was removed from the test tube and wrapped in paper wipe and heated to 110° C. for 6 hours after which the temperature was returned to room temperature without disturbing the rods.

A hard, transparent rod was obtained that could be machined to an intraocular lens using techniques standard in the intraocular lens and contact lens industries.

A disc was cut from this rod; in its hydrated form it had a thickness of 1.19 mm. The UV spectrum of this copolymer disc was obtained as in Example 2 after hydration and extraction. At 400 mm the transmittance was found to be 1.4%.

What is claimed is:

1. An ultraviolet absorbing hydrogel, comprising:
   a hydrogel forming monomer; and
   about 0.1 to about 10.0 weight percent of an ultraviolet absorbing monomer consisting essentially of:

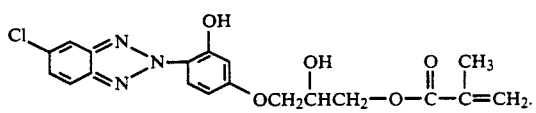

2. An ultraviolet absorbing hydrogel of claim 1 having a thickness of an intraocular or contact lens wherein the ultraviolet absorbing monomer has a transmittance of less than about 30% at 400 nanometers.

3. The ultraviolet absorbing hydrogel of claim 1 wherein the ultraviolet absorbing monomer is present at a concentration of about 3.5 weight percent.

4. The ultraviolet absorbing hydrogel of claim 1 wherein the hydrogel forming monomer is selected from the group consisting of: hydroxyalkyl methacrylates and hdyroxyalkyl acrylates cross linked with a small percentage of the corresponding diester, N-vinyl heterocyclic monomers, polymerizable olefinic acids, polymerizable olefinic amides and lower alkyl vinyl ethers.

5. The ultraviolet absorbing hydrogel of claim 1, wherein the hydrogel forming monomer comprises hydroxyethyl methacrylate.

6. An intraocular lens comprising an ultraviolet absorbing hydrogel, said hydrogel comprising:
   a hydrogel forming monomer; and
   an ultraviolet absorbing monomer consisting essentially of:

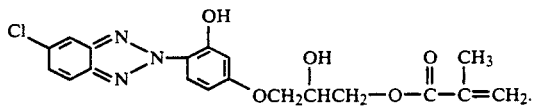

7. The intraocular lens of claim 6 wherein the hydrogel forming monomer is elected from the group consisting of; hydroxyalkyl methacrylates and hydroxyalkyl acrylates cross linked with a small percentage of the corresponding diester, N-vinyl heterocyclic monomers, polymerizable olefinic acids, polymerizable olefinic amides and lower alkyl vinyl ethers.

8. The intraocular lens of claim 6 wherein the hydrogel forming monomer comprises hydroxyethyl methacrylate.

9. The intraocular lens of claim 6 wherein the ultraviolet absorbing monomer is present at a concentration of from about 0.1 to about 4.0 weight percent.

10. The intraocular lens of claim 6 wherein the ultraviolet absorbing monomer is present at a concentration of about 3.5 weight percent.

11. A contact lens comprising an ultraviolet absorbing hydrogel, said hydrogel comprising:
    a hydrogel forming monomer; and
    an ultraviolet absorbing monomer consisting essentially of:

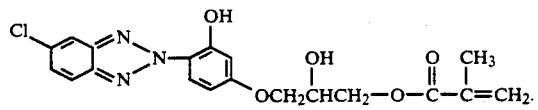

12. The contact lens of claim 11 wherein the hydrogel forming monomer is selected from the group consisting of: hydroxyalkyl methacrylates and hydroxyalkyl acrylates cross linked with a small percentage of the corresponding diester, N-vinyl heterocyclic monomers, polymerizable olefinic acids, polymerizable olefinic amides and lower alkyl vinyl ethers.

13. The contact lens of claim 11 wherein the hydrogel forming monomer comprises hydroxyethyl methacrylate.

14. The contact lens of claim 11 wherein the ultraviolet absorbing monomer is present at a concentration of between about 0.1 and 4.0 weight percent.

15. The contact lens of claim 14 wherein the ultraviolet absorbing monomer is present at a concentration of about 3.5 weight percent.

* * * * *